(12) United States Patent
Lau (10) Patent No.: US 7,111,729 B2
(45) Date of Patent: Sep. 26, 2006

(54) LOW-PROFILE DISK CASE

(75) Inventor: Kwok Din Lau, Chai Wan (HK)

(73) Assignee: Finest Industrial Co., Ltd., Chai Wan (HK)

( * ) Notice: Subject to any disclaimer, the term of this patent is extended or adjusted under 35 U.S.C. 154(b) by 322 days.

(21) Appl. No.: 10/414,815

(22) Filed: Apr. 15, 2003

(65) Prior Publication Data

US 2004/0206641 A1    Oct. 21, 2004

(51) Int. Cl.
*B65D 85/57* (2006.01)
(52) U.S. Cl. .................... 206/312; 206/310; 206/308.1
(58) Field of Classification Search ............ 206/308.1, 206/310, 312, 309, 307, 473, 493
See application file for complete search history.

(56) References Cited

U.S. PATENT DOCUMENTS

| | | | | |
|---|---|---|---|---|
| 5,284,248 | A | 2/1994 | Dunker | 206/444 |
| 5,944,181 | A | 8/1999 | Lau | |
| 6,021,894 | A * | 2/2000 | Lakoski et al. | 206/308.1 |
| 6,053,311 | A | 4/2000 | Grobecker et al. | 206/308.1 |
| 6,152,297 | A | 11/2000 | Roth et al. | 206/308.1 |
| 6,216,862 | B1 * | 4/2001 | Chang | 206/308.1 |
| 6,237,763 | B1 | 5/2001 | Lau | 206/308.1 |
| 6,298,986 | B1 * | 10/2001 | Chang | 206/310 |
| 6,502,703 | B1 * | 1/2003 | Scherer et al. | 211/40 |
| 6,554,132 | B1 | 4/2003 | Lau | |
| 6,662,943 | B1 * | 12/2003 | Yang | 206/308.1 |
| 6,726,007 | B1 * | 4/2004 | Huang | 206/308.1 |
| 6,749,061 | B1 * | 6/2004 | Clausen | 206/308.1 |
| 2002/0112974 | A1 | 8/2002 | Lau | 206/308.1 |

FOREIGN PATENT DOCUMENTS

WO        WO99/03756        1/1999

\* cited by examiner

*Primary Examiner*—David T. Fidei
(74) *Attorney, Agent, or Firm*—Marc Karish; Sheldon & Mak PC (57) ABSTRACT

A low-profile CD/DVD disk case has base and lid portions and spaced apart integrally formed living hinge members that extend between portions of a spine structure, the spine structure forming a rigid enlargement of the base portion. Preferably, the length and width of the base portion, including that of the spine structure, correspond to like dimensions of a standard jewel case, and an overall open length of the base and lid portions also correspond to that of the standard jewel case for automated handling and loading using existing jewel case machinery. Also, the thickness of the case can be only 5.2 mm, about half that of the standard jewel case, and there can be clearance openings for receiving standard storage posts, rings, or the like. Moreover, the case can be configured to hold two conventional disks within the same 5.2 mm thickness.

28 Claims, 5 Drawing Sheets

LOW-PROFILE DISK CASE

BACKGROUND

The present invention relates to the packaging of optical data disks such as compact disks (CDs) and video disks (DVDs) that have central circular locating openings, and more particularly to cases for protectively enclosing such disks for storage of same.

Data disks such as compact disks and video disks typically have large amounts of digitally stored information that is optically readable through a transparent bottom layer of the disk by a movable head during rotation of the disk. Protective containers for CDs and DVDs in common use have a central pedestal for supportively gripping the disc by engaging the central opening without contacting either side of the disk within data-containing regions thereof. Such containers typically have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal and simultaneous lifting at the perimeter portions. See, for example, the present inventor's U.S. Pat. No. 6,237,763, which is incorporated herein by this reference.

One class of containers, known as "jewel boxes" have a clear plastic body and a pivotally connected clear plastic lid, an insert member fitting within the body and being formed with the various disk-contacting surfaces and associated members. Another class of containers has the body and lid integrally formed and pivotally joined along opposite edges of a narrow, generally rectangular spine member, with disk-supporting structure integrally formed in the body, such containers referred to as "DVD boxes" being somewhat oversize as compared with the jewel boxes. These boxes have an important advantage of being less expensive to provide than jewel boxes. However, large-scale utilization of integrally formed cases is hampered by large investments in machinery for handling and loading the conventional jewel boxes, such machinery being not suited for handling the integrally formed cases.

An additional advantage of integrally formed cases is that they can be made thinner, with corresponding savings in the space required for storage of the cases. However, existing devices for storing CD and DVD cases have proven somewhat unsatisfactory. Typical storage devices have spaced inwardly facing flanges defining slots for receiving individual cases. These devices are awkward to use in that insertion of the cases between pairs of the flanges at opposite extremities of a case requires some coordination, and the process is made more difficult by the cases being subject to partial opening such that one of the flanges is likely to become stuck between the body and lid of a case being inserted. Storage devices having clear cavities for holding multiple cases also make it difficult to grasp a single case for removal thereof, as well as for inserting a case between a desired pair of previously stored cases.

Thus there is a need for a disk container that overcomes the disadvantages of the prior art.

SUMMARY

The present invention meets this need by providing a low-profile storage case of the type having base and lid portions, a hub structure on the base portion for releasably engaging a compact disk enclosed within the case when the lid is closed, the case being particularly inexpensive to provide as well as being adapted for high-speed loading using existing automation equipment. In one aspect of the invention, the storage case is characterized by having a hinge structure connected between and integrally formed with the base and lid; and a spine structure rigidly connected to the base and including respective enlargements that extend between opposite ends of the hinge structure to proximate alignment with opposite side extremities of the base, the enlargement portions also being approximately flush with the base and lid in the closed position of the lid. Preferably the hinge structure is recessed toward the base between the spine enlargement portions for limiting an overall length of the case when the lid is opened coplanar with the base, that length being less than double a corresponding length of the case when the lid is closed. The spine structure can be integrally formed with the base. The hinge structure can include a spaced pair of hinge members, the spine structure further comprising an additional enlargement portion extending between the hinge members.

The lid and base portion can be formed with respective perimeter side walls extending along opposite side extremities of the case and along a side thereof opposite the hinged connection, the lid also having a projecting rib that extends between opposite extremities of the lid near the spine structure in the closed position of the lid.

Preferably the case has a pair of clearance openings extending therethrough generally perpendicular to the base for receiving binder posts or rings, the clearance openings being located outside of an area bounded by the perimeter side walls and the rib in the closed position of the lid portion for maintaining the disk in a substantially closed volume when the lid is closed notwithstanding the clearance openings. The clearance openings can be located within the tab portions of the hinge structure.

The base can have a shroud formation near an outer perimeter of the disk when the disk is supported on the hub structure, the shroud formation projecting forwardly of the disk for blocking deflection of the lid portion thereat. The shroud formation can have finger depressions that extend close to opposite side extremities of the base, the opposite side extremities of the base also having upstanding side portions that are interrupted near each of the finger depressions for facilitating removal of the disk. Preferably the lid has respective side projections that extend along corresponding ones of the finger depressions proximate the side extremities of the base when the lid is closed for maintaining the disk in a substantially closed volume notwithstanding the interruptions in the side portions of the base.

The storage case can be adapted for the disk having an outside diameter of approximately 120 mm, the case preferably having a length of approximately 143 mm and a width of approximately 125 mm when the lid is closed, the spine structure being approximately flush with the lid portion in the closed position thereof, and wherein the case has an overall length of approximately 275 mm when the lid is opened coplanar with the base for compatibility with existing automation equipment. Preferably the storage case has a thickness not greater than approximately 5.2 mm when the lid is closed, the disk having a thickness of approximately 1.3 mm, for doubling the disk storage capacity of space formerly occupied by conventional jewel boxes.

The storage case can have a second hub structure rearwardly projecting from the lid for holding a second disk in the case when the lid is closed position, each of the hub structures including plural circumferentially spaced segments for engaging central openings of respective disks, the segments projecting through and beyond the corresponding disk, being formed for facilitating insertion, retention, and removal of the disk, wherein the segments of each hub structure project between adjacent segments of the other hub structure in the closed position of the lid portion for permitting close spacing of the disks when the disks are supported on respective ones of the hub structures. Preferably the segments of each hub structure are flexibly supported on respective arm members, and having inwardly extending approximately coplanar button surfaces for facilitating release of a disk being held by the segments. Preferably each hub structure also includes a centrally located button member that is supported independently of the segments, the button members having facing engagement when the lid is closed for enhanced structural integrity of the storage case. Preferably the thickness of the case holding two disks of approximately 1.3 mm thickness is not more than approximately 5.2 mm, for quadrupling the disk storage capacity of space formerly occupied by conventional jewel boxes.

In another aspect of the invention, a storage case of the type having base and lid portions, hub structures on the base and lid for releasably engaging respective compact disks enclosed within the case when the lid is closed is characterized by each of the hub structures including plural circumferentially spaced segments for engaging the central opening of the corresponding disk, the segments projecting through and beyond the corresponding disk, being formed for facilitating insertion, retention, and removal of the disk, wherein the segments of each hub structure project between adjacent segments of the other hub structure when the lid is closed for permitting close spacing of the disks when the disks are supported on the hub structures. Preferably the thickness of the case holding two disks of approximately 1.3 mm thickness is not more than approximately 5.2 mm, for quadrupling the disk storage capacity of space formerly occupied by conventional jewel boxes.

DRAWINGS

These and other features, aspects, and advantages of the present invention will become better understood with reference to the following description, appended claims, and accompanying drawings, where:

DESCRIPTION

Figure 1:
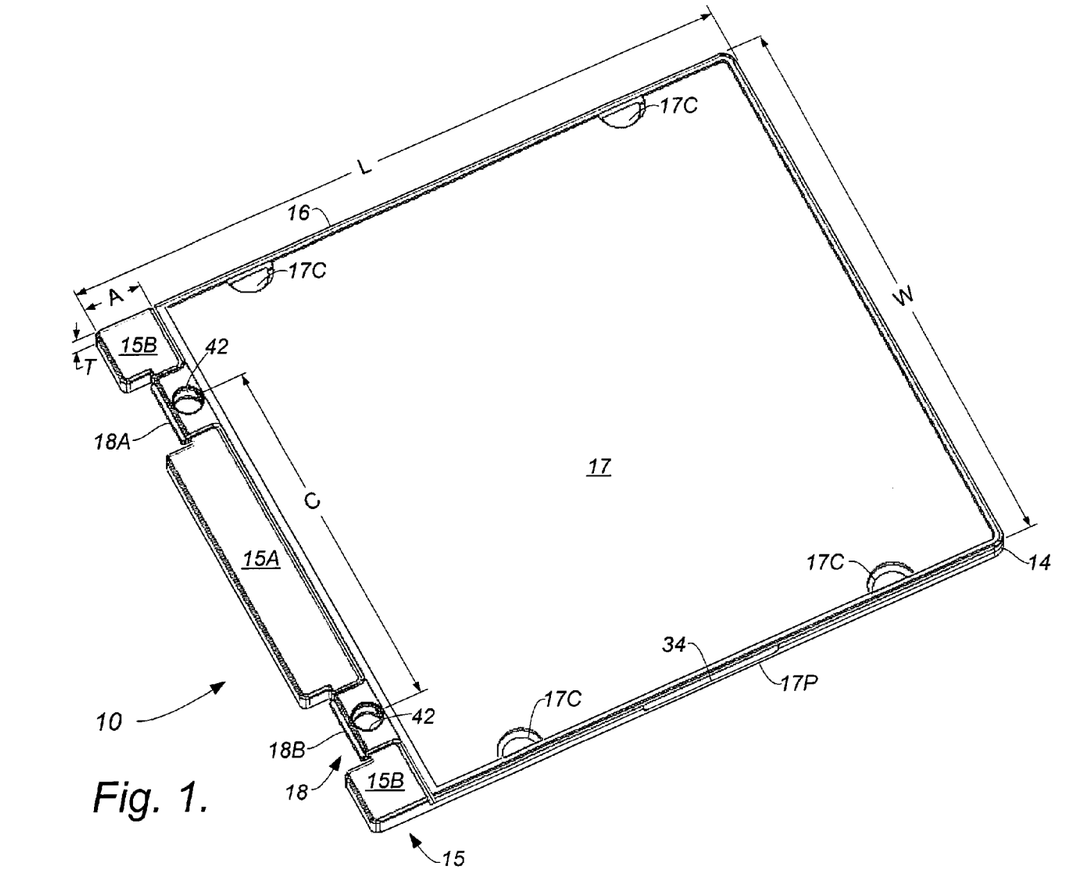
FIG. 1 is a left-oblique perspective view of a protective disk case according to the present invention, the case being in a closed condition.
Figures 2, 3, 4:
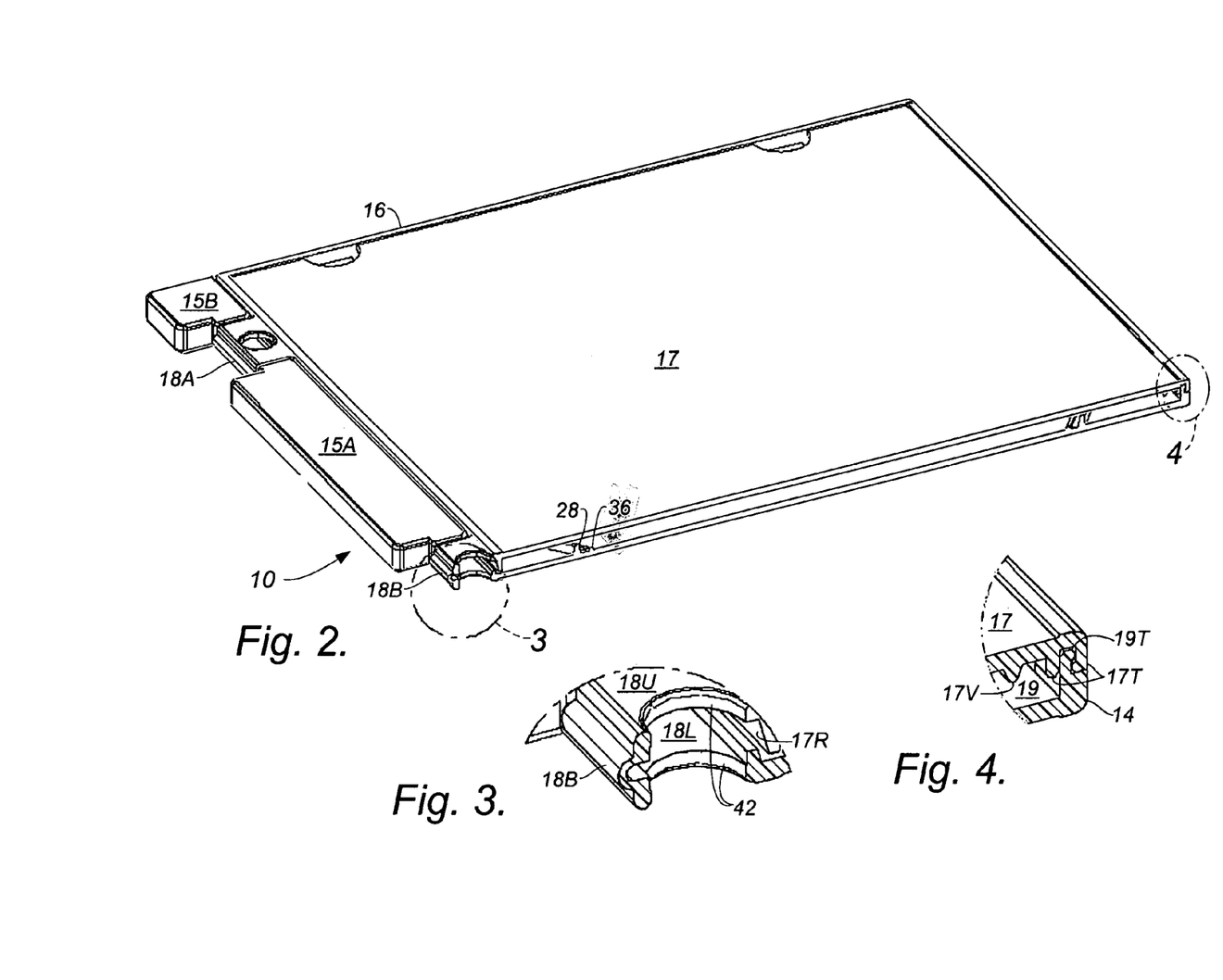
FIG. 2 is a left-oblique perspective sectional view of the case of FIG. 1.
FIG. 3 is a perspective detail view within region 3 of FIG. 2.
FIG. 4 is a perspective detail view within region 4 of FIG. 2.
Figures 5, 6, 7:
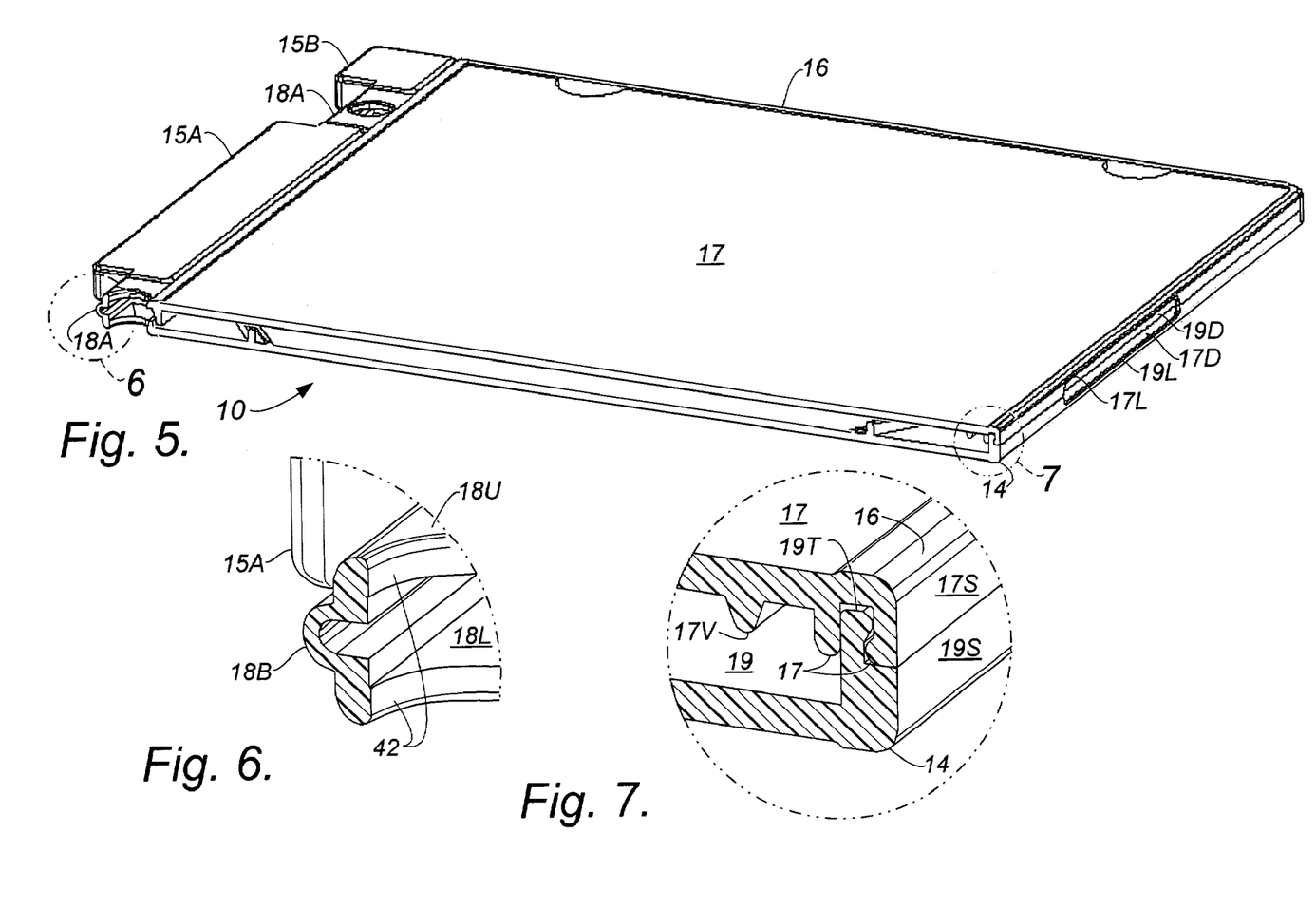
FIG. 5 is a right-oblique perspective sectional view of the case of FIG. 1.
FIG. 6 is a perspective detail view within region 6 of FIG. 5.
FIG. 7 is a perspective detail view within region 7 of FIG. 5.

The present invention is directed to a disk storage case that is particularly inexpensive to both provide and to load with existing automation equipment, as well as being significantly less bulky than conventional packaging. With reference to FIGS. 1–9 of the drawings, a storage case 10 has a base portion 14 a lid portion 16, and a hinge structure 18 that movably connects the base and lid portions. Preferably, the case 10 is an integrally formed molded member, the hinge structure 18 including a spaced pair of hinge members, designated 18A and 18B, being formed as so-called "living hinges" as best shown in FIGS. 3 and 6. The base and lid portions 14 and 16 include respective lid panel and base panel portions 17 and 19, and respective perimeter side portions 17S and 19S that snap together in edgewise adjacency in a closed condition of the box 10 as best shown in FIGS. 4 and 7, the side portions 17S and 19S together forming three side walls of the case 10, the lid panel portion 17 forming a front wall, the base panel portion 19 forming a rear wall; and a rib portion 17R of the lid portion 16 is inwardly spaced proximate the hinge structure 18 to form a fourth side wall of the case 10. In accordance with the present invention, a spine structure 15 forms a rigid enlargement of the base portion 14, the hinge members 18A and 18B being recessed toward the base portion relative to the spine structure 15 for compatibility with existing automated equipment for handling conventional jewel boxes. In a preferred exemplary configuration shown in the drawings, the spine structure includes, respectively, a spine portion 15A (located between the hinge members 18A and 18B) and a pair of spine portions 15B (located opposite the spine portion 15A from respective ones of the hinge members 18A and 18B). Thus the spine structure 15, as a whole, forms an enlargement of the base portion that extends between opposite ends of the hinge structure and to proximate alignment with opposite side extremities of the base portion, being approximately flush with the base and lid portions 14 and 16 and in correspondence with a plan outline of the spine structure of standard jewel cases to facilitate automated handling of the case 10 using existing machinery that is adapted for handling the standard jewel cases.

Mating pairs of tab structures provide the snap together engagement of the case, the tab structures of the lid portion 16 being designated 17T and those of the base portion 14 being designated 19T as shown in FIGS. 4 and 7. also, the lid portion 16 has respective ridge reinforcements formed proximate the tab formations 17T for stiffening the led panel portion 17. In further description of the case 10, the terms "front" and "forward" with respect to the base refer to a direction toward the lid portion 16 in the closed condition of the case 10; conversely, "rear", "rearward", and "back" refer to a direction away from the lid portion.

Figure 8:
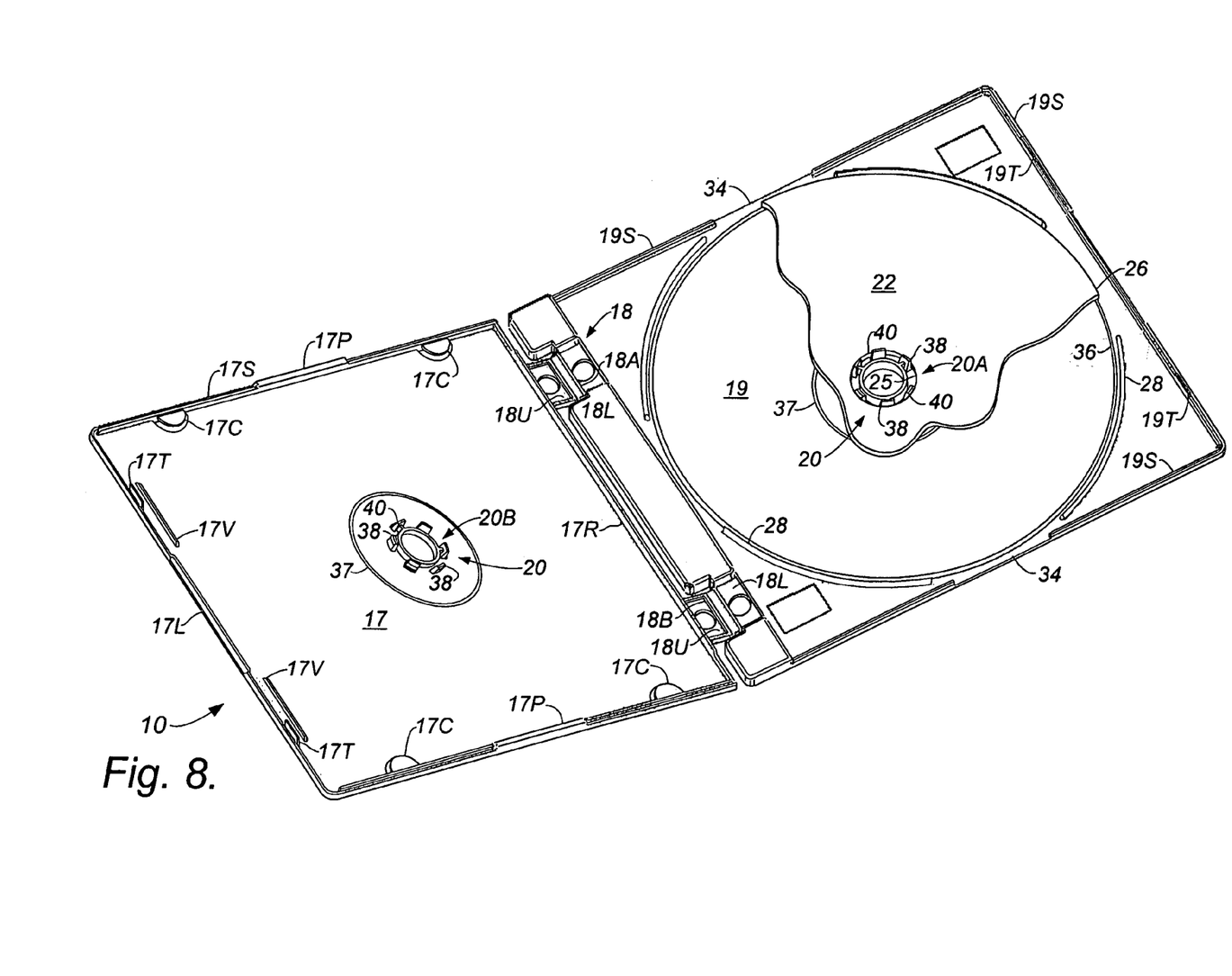
FIG. 8 is a perspective view as in FIG. 1, showing the case in a partially open condition, with hub structures of base and lid portions of the case being exposed.

As shown in FIG. 8, a hub structure 20 of the case 10 projects forwardly from the panel portion 19 of the base 14 for supportively engaging a compact disk (CD) or digital video disk (DVD) 22 having front and rear surfaces, a central opening 25, and a periphery 26, the hub structure engaging the central opening 25. A shroud formation 28 of case 10 also projects forwardly on the panel portion 19 in generally concentric relation to the hub structure 20 proximate the periphery 26 of a disk being supported on the hub structure 20, the shroud formation 28 projecting forwardly of the disk 22 for blocking inadvertent contact with the disk. More particularly, the shroud formation 28 projects to proximate the lid panel portion 17 in the closed position of the lid portion 16, greatly enhancing the structural integrity of the case 10 when the lid portion 16 is closed. The shroud formation 28 is segmented, with at least one pair of finger depressions 34 being formed in the base panel 19 between pairs of the segments for facilitating opposite perimeter portions of the disk 22 being grasped by a user of the container 10. Also, a first ring structure 36 projects slightly forwardly of the base panel portion 19 for stabilizing the disk proximate the periphery 26 thereof, and a second ring structure 37 similarly supports the disk proximate the hub structure 20. The finger depressions 34 extend to side extremities of the base 14, interrupting the base side portion 19S, further facilitating removal of the disk 22. Correspondingly, the lid side portions 17S have respective projections 17P formed thereon, the projections extending proximate respective edge extremities of the depressions 34 in the closed condition of the case 10 as best shown in FIG. 1. For facilitating opening of the case 10, the side portions 17S and 19S of the base 14 and the lid 16 have respective inwardly displaced portions 17D and 19D opposite the hinge structure 18 as shown in FIG. 5, associated overhanging lips 17L and 19L being formed along respective edge extremities of the base 14 and lid 16 for grasping by a user of the case 10. The lid 14 also has conventional clips 17C for retaining literature inside the case 10, as best shown in FIGS. 1 and 4.

Typically, the storage case 10 is configured for conventional disks having a thickness of between 1.2 mm and 1.3 mm, the periphery 26 being 120 mm in diameter, the central opening 25 having an inside diameter of 15 mm. While the hub structure 20 can be variously configured, an exemplary form thereof includes a plurality of substantially rigid arcuate segments 38 that engage the central opening 25 of the disk 22, and a corresponding plurality of flexible hook members 40 for releasably retaining the disk proximate the second ring structure 37. Another type of hub structure is described in the above-referenced U.S. Pat. No. 6,237,763. Other typical features of protective disk cases, such as externally visible labeling, and transparent sheet covers, are contemplated although not described.

As further shown in FIG. 8, there are two hub structures 20, one being that described above and also designated 20A. Another hub structure, designated 20B, projects rearwardly from the lid panel portion 17 (in the closed position of the lid portion 16). In further accordance with the present invention, the hub segments 38 of the hub structures 20 are preferably circumferentially spaced from the corresponding hook segments 40 sufficiently for clearance with respective hub segments 38 and hook segments 40 of the opposing hub structure, so that respective disks 26 being held by the hub structures 20 can be closely spaced in facing relation with the lid portion 16 in the closed position thereof, not withstanding significant projection of the hub segments 38 and hook segments within the central openings 25 of both of the disks 26. Preferably the projecting portions of the hub segments 38 and the hook segments 40 of each hub structure 20 make no more than incidental contact with the disk 26 being retained by the opposing hub structure. It will be understood that the hub structure 20B of the lid portion 16 is optional. Further, the shroud formation 28 and the ring structures 36 and 37 on the base panel 19 are optional although preferred. Similarly, although these features are not shown on the lid panel 17, any or all of them can be included in the case 10. In the case of a shroud formation 28 being both on the base and lit portions 14 and 16, they would each be of reduced height, preferably having facing contact in the closed position of the lid portion for enhanced structural integrity when the case is closed as described above.

In further accordance with the present invention, the hinge structure 18 includes pairs of tab portions between which the hinge members 18A and 18B are connected, the tab portions being designated lower tab portions 18L (that form rigid projections from the base panel portion 19) and upper tab portions 18U (that similarly form rigid projections from the lid portion 17. Additionally, a prong opening 42 is formed through each pair of the upper and lower tab portions 18U and 18L for receiving respective prong or ring members (not shown) by which multiple counterparts of the storage cases 10 (in closed conditions thereof can be retained in a particularly compact arrangement. Advantageously, the prong openings 42 extend through the case 10 in the closed position of the lid portion outside of an area bounded by the lid and base side portions 17S and 19S, and by the rib portion of the lid portion, thereby maintaining the case more or less dust-tight whether or not the prong openings have prongs or other members projecting therethrough. Also, the prong openings are advantageously located relatively close to an outside edge extremity of the spine structure for facilitating storage on rings of a ring binder, or on a device similarly having limited clearance for the spine structure. It will be understood that alternatively, the prong openings can be located within the above-proscribed area, so long as they are located outside of an area to be occupied by the disk 22, preferably outside of an area bounded by the shroud formation to insure clearance for the disk.

As further shown in FIG. 1, the storage case 10 has a length L and a width W in the closed condition thereof, these dimensions preferably corresponding to those of standard jewel cases, namely the length L being approximately 143 mm and the width W being approximately 125 mm when the case 10 is configured for conventional disks of 120 mm diameter. Advantageously, the case 10 has a thickness T in the closed condition thereof, the thickness T being only approximately 5.2 mm, which is only about half the corresponding thickness of standard jewel boxes. Moreover, the case 10 has an overall length OL in a fully opened condition shown in FIG. 9, the length OL corresponding to that of standard jewel boxes, namely approximately 275 mm. Thus, although the case 10 occupies only approximately half the volume of standard jewel boxes, it is compatible with conventional automated equipment for handling and loading standard jewel boxes. The case 10 also requires only approximately half the volume of molded material as compared with that of standard jewel boxes, which in addition to the integrally molded configuration of the base 14, lid 16, and hinge structure 18, that obviates the need for assembly operations, results in substantially reduced cost of manufacture as compared with that of standard jewel boxes. In the above-described exemplary configuration, the prong openings 42 are spaced apart by a center distance C that can be approximately 80 mm, more or less, the openings 42 being approximately 6 mm in diameter for compatibility with standard binder and prong hardware. Alternatively, the distance C can be approximately 70 mm (2.75 inches) for compatibility with other standard binder and prong hardware.

Figures 9, 11:
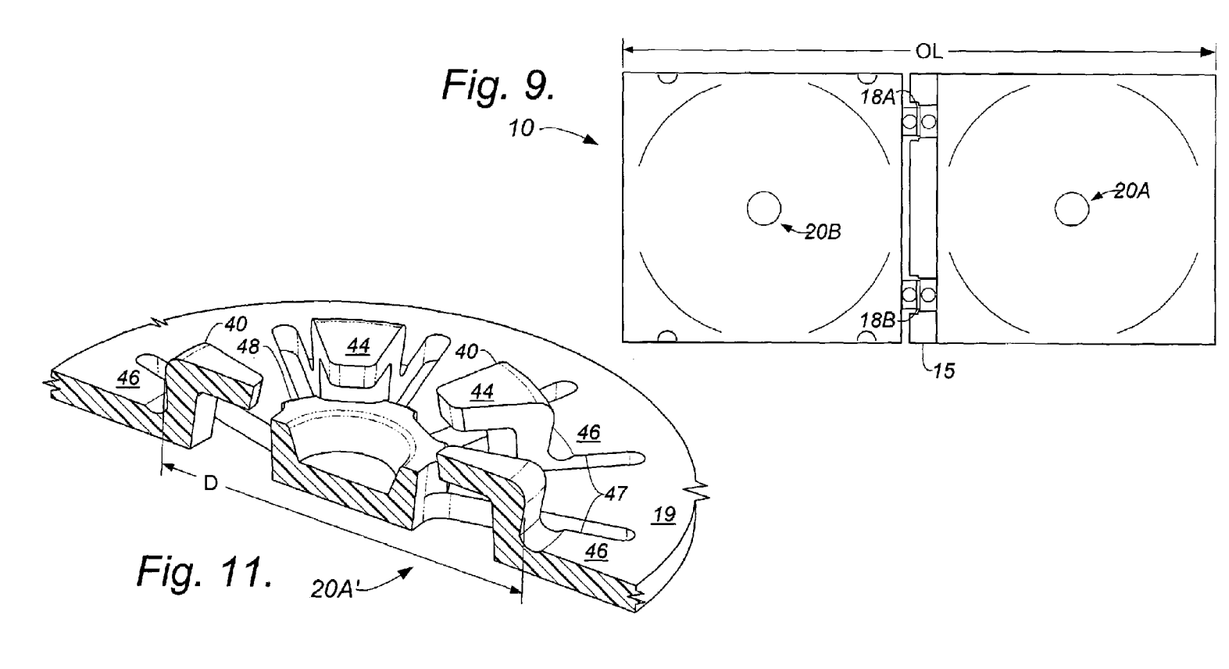
FIG. 9 is a plan view of the case of FIG. 1 in a fully open condition.
FIG. 11 is a perspective detail view of one of the hub structures of FIG. 10.
Figure 10:
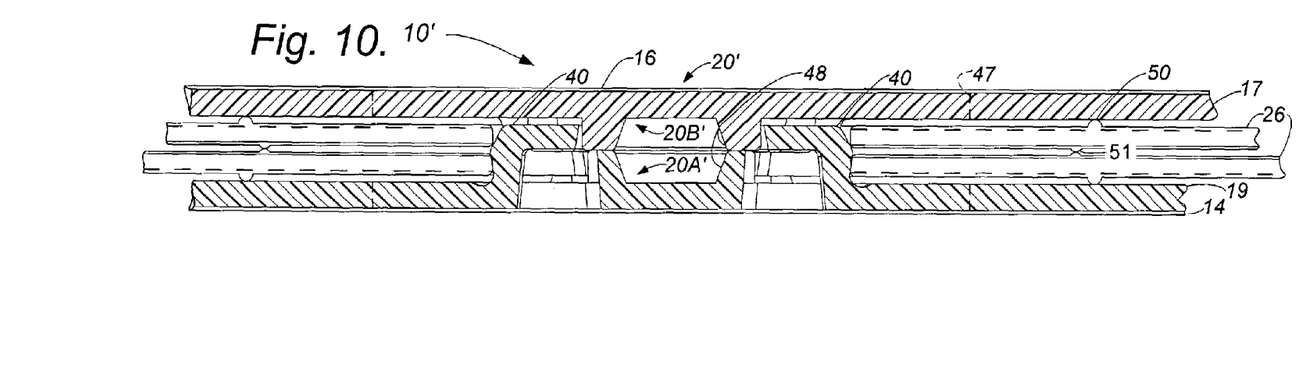
FIG. 10 is a longitudinal sectional view showing an alternative configuration of the hub structures depicted in FIG. 8.

With further reference to FIGS. 10 and 11, an alternative configuration of the case, designated 10', has counterparts of the hub structures, designated 20A' and 20B' (and collectively designated 20') formed having counterparts of the hook members, designated 40', that project inwardly, having generally coplanar button surfaces 44 as shown in FIG. 11. Also, the hook members 40 are supported on respective arms 46 that are formed in the base panel portion 19 (in the case of the hub structure 20A') and bounded by respective pairs of slots 47. The base panel portion 19 also extends between the arms 46 for supporting a central button ring 48 of the hub structure 20A'. The hub structure 20B' (not shown in FIG. 11) is of like construction, the arms 46 and the slots 47 thereof being formed in the lid panel portion 17 as shown in FIG. 10, but with the hub structure 20B' rotated so that the hook members extend in overlapping axial relation as described above in connection with FIG. 8. As further shown in FIG. 10, the button rings of the hub structures 20' have facing engagement when the lid 16 is in the closed position for maintaining axial spacing between the respective hook members 40' and disks being supported thereon. This facing engagement of the button rings 48 adds to the structural integrity of the case 10', allowing for a particularly compact arrangement wherein the disks can have contact with each other as well as the respective lid and base panel portions 17 and 19 at respective ring projections 50 and 51 that are conventionally formed in the disks 26. Accordingly, the present invention provides a particularly advantageous case configuration having a capacity of two conventional compact disks, the overall thickness T of the case being only 5.2 mm, which is half the thickness of a conventional jewel case as described above. Moreover, the configuration of FIGS. 10 and 11 does not include the hub segments 38 of FIG. 8, the six hook members 40 being sufficiently robust to fully support the disks 26, and being sufficiently flexible for removal of the disks by virtue of being supported on the inwardly extending arms 46. In this respect, the hook members 47 taper inwardly toward the base panel portion 19 (in the case of the hub structure 20A') from a maximum diameter D of 15.3 mm when the disk 26 is not present, the diameter D being reduced to 15 mm when engaging the disk 26, the disk 26 being securely held thereby. Removal of the disk 26 is facilitated by the application of finger pressure to the inwardly extending button surfaces 44 of the hook members 40.

Suitable materials for molding the hub structures 20, and particularly the hub structures 20' of FIGS. 10 and 11, include polypropylene and polystyrene. A suitable material for molding the hinge structure 18, including the hinge members 18A and 18B, is polypropylene. Thus a preferred exemplary implementation of the storage case 10' of FIGS. 10 and 11 is molded from polypropylene.

Although the present invention has been described in considerable detail with reference to certain preferred versions thereof, other versions are possible. For example, the enlargement structure 15 can be separately formed and bonded to the base portion 14. Therefore, the spirit and scope of the appended claims should not necessarily be limited to the description of the preferred versions contained herein.

What is claimed is:

1. In a storage case of the type having a base portion and a lid portion having a closed position facing the base portion, a forwardly projecting hub structure of the base portion for releasably engaging a central opening of a disk having an outer perimeter with the disk being enclosed within the case when the lid portion is in the closed position, there being means for releasably holding the lid portion in the closed position, the lid portion being openable to an open position being generally co-planar with the base portion for loading and/or accessing the disk, characterized in that the case further comprises:
   a. a spaced pair of hinge members connected between and integrally form molded with the base portion and the lid portion; and
   b. a spine structure rigidly connected to the base portion and comprising respective enlargement portions thereof extending from opposite ends of the hinge members to proximate alignment with opposite side extremities of the base portion, and an additional enlargement portion extending between the hinge members, the enlargement portions also being approximately flush with the bottom of the base portion and the top of the lid portion in the closed position of the lid portion.

2. The storage case of claim 1, wherein the hinge structure is recessed toward the base portion between the enlargement portions of the spine structure for limiting an overall length of the case in the open position of the lid portion to less than double a length of the case in the closed position of the lid portion.

3. The storage ease of claim 1, wherein the spine structure is integrally formed with the base portion.

4. The storage case of claim 1, wherein the lid portion and the base portion are formed with respective perimeter side walls extending along opposite side extremities of the case and along a side thereof opposite the hinged connection, the lid portion also having a rib projecting therefrom and extending between opposite extremities of the lid portion proximate the spine structure in the closed position of the lid portion.

5. The storage case of claim 4, having a pair of clearance openings extending therethrough generally perpendicular to the base, the clearance openings being located outside of an area bounded by the perimeter side walls and the rib in the closed position of the lid portion.

6. The storage case of claim 5, wherein each of the hinge members being connected to the base and lid portions by respective tab portions, the clearance openings being located within the tab portions of the hinge structure.

7. The storage ease of claim 1, wherein the base portion has a shroud formation proximate the outer perimeter of the disk when the disk is supported on the hub structure, the shroud formation projecting forwardly of the disk for blocking deflection of the lid portion thereat.

8. The storage case of claim 7, wherein the shroud structure has respective finger depressions formed proximate opposite side extremities of the base portion, the base portion also including upstanding side portions extending along the side extremities, the side portions being interrupted proximate each of the finger depressions.

9. The storage case of claim 8, wherein respective side projections of the lid portion extend along corresponding ones of the finger depressions proximate the side extremities of the base portion in the closed position of the lid portion.

10. The storage case of claim 7, having a pair of clearance openings extending therethrough generally perpendicular to the base, the clearance openings being located outside of an area bounded by the shroud formation in the closed position of the lid portion.

11. The storage case of claim 1, being adapted for receiving the disk having a perimeter diameter of approximately 120 mm, the case having a length, a width, and a thickness in the closed position of the lid portion, the length being approximately 143 mm and the width being approximately 125 mm, and wherein the case has an overall length being approximately 275 mm in the open position of the lid portion.

12. The storage case of claim 11, for the disk having a thickness of approximately 1.3 mm, wherein the thickness of the case in the closed position of the lid portion is not greater than approximately 5.2 mm.

13. In a storage case of the type having a base portion and a lid portion having a closed position facing the base portion, a forwardly projecting hub structure of the base portion for releasably engaging a central opening of a disk having an outer perimeter with the disk being enclosed within the case when the lid portion is in the closed position, there being means for releasably holding the lid portion in the closed position, the lid portion being openable to an open position being generally co-planar with the base portion for loading and/or accessing the disk, characterized in that the case further comprises:
   a. a spaced pair of hinge members connected between and integrally formed with the base portion and the lid portion; and
   b. a spine structure rigidly connected to the base portion and comprising respective enlargement portions thereof extending from opposite ends of the hinge members to proximate alignment with opposite side extremities of the base portion, and an additional enlargement portion extending between the hinge members, the enlargement portions also being approximately flush with the bottom of the base portion and the top of the lid portion in the closed position of the lid portion;
   wherein the hub structure is a first hub structure for releasably holding a first disk, there being a rearwardly projecting second hub structure of the lid portion for releasably holding a second disk within the case when the lid portion is in the closed position, each of the hub structures comprising plural circumferentially spaced segments for engaging the central opening of the corresponding disk, the segments projecting through and beyond the corresponding disk, being formed for facilitating insertion, retention, and removal of the disk, wherein the segments of each hub structure project between adjacent segments of the other hub structure in the closed position of the lid portion for permitting close spacing of the disks when the disks are supported on respective ones of the hub structures.

14. The storage case of claim 13, wherein the segments of each hub structure are flexibly supported on respective arm members, the segments of each hub structure having inwardly extending approximately coplanar button surfaces for facilitating release of a disk being held by the segments.

15. The storage case of claim 14, each hub structure also further comprising a centrally located button member supported independently of the segments, the button members of the hub structures having facing engagement in the closed position of the lid portion for enhanced structural integrity of the storage case.

16. The storage case of claim 13, for the disks each having a thickness of approximately 1.3 mm, wherein the thickness of the case in the closed position of the lid portion is not greater than approximately 5.2 mm.

17. A storage case for a disk having a central opening and an outer perimeter of approximately 120 mm diameter, comprising:
   a. a base portion having a forwardly projecting hub structure for releasably engaging the central opening of the disk, and a shroud formation proximate the outer perimeter of the disk when the disk is supported on the hub structure, the shroud formation projecting forwardly of the disk for blocking deflection of the lid portion thereat;
   b. a lid portion;
   c. a spaced pair of hinge members connected between and integrally form molded with the base and lid portions, the lid portion having a closed position releasably engaging the base portion, and an open condition generally coplanar with the base portion, the hinge structure comprising a spaced pair of hinge members, each of the hinge members being connected to the base and lid portions by respective tab portions;
   d. a spine portion integrally formed with the base portion and comprising respective enlargement portions thereof rigidly extending from the hinge members and to proximate alignment with opposite side extremities of the base portion; and
   e. wherein the case has a length, a width, and a thickness in the closed position of the lid portion, the length being approximately 142 mm and the width being approximately 124 mm, the spine structure being approximately flush with the lid portion, and wherein the case has an overall length being approximately 275 mm in the open position of the lid portion.

18. The storage case of claim 17, for the disk having a thickness of approximately 1.3 mm, wherein the thickness of the case in the closed position of the lid portion is not greater than approximately 5.2 mm.

19. The storage case of claim 17, wherein the lid portion and the base portion are formed with respective perimeter side walls extending along opposite side extremities of the case and along a side thereof opposite the hinged connection, the lid portion also having a rib projecting therefrom and extending between opposite extremities of the lid portion proximate the spine structure in the closed position of the lid portion.

20. The storage case of claim 17, with a pair of clearance openings extending through the case generally perpendicular to the base, the clearance openings being located within the tab portions of the hinge structure.

21. In a storage case of the type having a base portion and a lid portion having a closed position facing the base portion, a forwardly projecting first hub structure of the base portion for releasably engaging a central opening of a first disk having an outer perimeter with the disk being enclosed within the case when the lid portion is in the closed position, a second, rearwardly projecting hub structure of the lid portion for releasably holding a second disk within the case when the lid portion is in the closed position, there being means for releasably holding the lid portion in the closed position, the lid portion being openable for loading and/or accessing the disk, characterized in that each of the hub structures comprises plural circumferentially spaced segments for engaging the central opening of the corresponding disk, the segments projecting through and beyond the corresponding disk, being formed for facilitating insertion, retention, and removal of the disk, wherein the segments of each hub structure project between adjacent segments of the other hub structure in the closed position of the lid portion for permitting close spacing of the disks when the disks are supported on respective ones of the hub structures.

22. The storage case of claim 21, for the disks each having a thickness of approximately 1.3 mm, wherein the thickness of the case in the closed position of the lid portion is not greater than approximately 5.2 mm.

23. The storage case according to claim 4, having a spaced pair of clearance openings formed therethrough generally perpendicular to the base for engagement by respective binder posts or rings when the disk is engaged by the hub structure.

24. The storage case of claim 23 wherein the clearance openings are formed in the hinge structure.

25. The storage ease according to claim 7, having a spaced pair of clearance openings formed therethrough generally perpendicular to the base for engagement by respective binder posts or rings when the disk is engaged by the hub structure.

26. The storage case of claim 25 wherein the clearance openings are formed in the hinge structure.

27. The storage case of claim 17, having a spaced pair of clearance openings formed therethrough generally perpendicular to the base for engagement by respective binder posts or rings when the disk is engaged by the hub structure.

28. The storage case of claim 27 wherein the clearance openings are formed in the hinge structure.

* * * * *